United States Patent
Asahina et al.

(10) Patent No.: US 8,772,434 B2
(45) Date of Patent: Jul. 8, 2014

(54) BLOCK POLYISOCYANATE AND URETHANE COMPOSITION CONTAINING THE SAME

(75) Inventors: Yoshiyuki Asahina, Tokyo (JP); Mio Minakawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 339 days.

(21) Appl. No.: 12/746,328

(22) PCT Filed: Dec. 12, 2008

(86) PCT No.: PCT/JP2008/072679
§ 371 (c)(1),
(2), (4) Date: Jun. 4, 2010

(87) PCT Pub. No.: WO2009/075358
PCT Pub. Date: Jun. 18, 2009

(65) Prior Publication Data
US 2010/0256324 A1     Oct. 7, 2010

(30) Foreign Application Priority Data
Dec. 12, 2007    (JP) ................. 2007-320651

(51) Int. Cl.
*C08G 18/72* (2006.01)
*C08G 18/09* (2006.01)
*C08G 18/62* (2006.01)
*C08G 18/10* (2006.01)
*C08G 18/42* (2006.01)
*C08G 18/80* (2006.01)

(52) U.S. Cl.
CPC ........ *C08G 18/6216* (2013.01); *C08G 2105/02* (2013.01); *C08G 18/092* (2013.01); *C08G 18/10* (2013.01); *C08G 18/4277* (2013.01); *C08G 175/04* (2013.01); *C08G 18/807* (2013.01)
USPC ......................................................... 528/85

(58) Field of Classification Search
CPC ....................................................... C08G 18/72
See application file for complete search history.

(56) References Cited

U.S. PATENT DOCUMENTS 6,111,048 A *  8/2000  Asahina et al. ................. 528/45
6,559,193 B2 *  5/2003  Nonoyama et al. ............. 521/95

FOREIGN PATENT DOCUMENTS

| EP | 0 159 117 | 10/1985 |
|----|-----------|---------|
| JP | 8-325353 | 12/1996 |
| JP | 2000-178505 | * 6/2000 |
| JP | 2001-329135 | 11/2001 |
| JP | 2001-329208 | 11/2001 |
| JP | 2003-155322 | 5/2003 |
| JP | 2004-107409 | 4/2004 |
| JP | 2007-23209 | 2/2007 |
| JP | 2008-156450 | 7/2008 |

OTHER PUBLICATIONS

English machine translation of JP2000-178505.*
International Search Report for PCT/JP2008/072679, mailed Jan. 13, 2009.
Indian Office Action issued with respect to counterpart Indian Application No. 2008/KOLNP/2010, mail date is Oct. 28, 2013.

* cited by examiner

*Primary Examiner* — Randy Gulakowski
*Assistant Examiner* — Jeffrey Washville
(74) *Attorney, Agent, or Firm* — Greenblum & Bernstein, P.L.C.

(57) ABSTRACT

Disclosed is a block polyisocyanate obtained by blocking at least a part of isocyanate groups of a polyisocyanate, which is derived from an aliphatic diisocyanate and a polyol and satisfies all of the conditions (1)-(5) shown below, with a pyrazole compound. (1) Average number of isocyanate groups: 3.0-20 (2) Diisocyanate monomer trimer concentration: 10-50% by mass (3) Isocyanate group concentration: 5-22% by mass (4) Polyol content concentration: 5-40% by mass (5) Diisocyanate monomer concentration: 3% by mass or less.

4 Claims, No Drawings

BLOCK POLYISOCYANATE AND URETHANE COMPOSITION CONTAINING THE SAME

TECHNICAL FIELD

The present invention relates to a blocked polyisocyanate which has low-temperature curability and achieves high coating film appearance and a urethane composition containing the same.

BACKGROUND ART

A coating film formed from urethane coating composition using a polyisocyanate as a curing agent is excellent in chemical resistance, flexibility and the like. Particularly, when a polyisocyanate obtained from an aliphatic or alicyclic diisocyanate is used, the coating film is further excellent in weatherability. Therefore, the polyisocyanate is used in the form of a room-temperature curable two-component urethane coating composition or a thermosetting one-component urethane coating composition in a wide variety of fields such as construction, heavy-duty coating, automobiles, industrial uses and there repairing.

Since the thermosetting one-component urethane coating composition does not react at room temperature and is excellent in storage stability, it is excellent in workability because the mixing of a polyol and a polyisocyanate immediately before use, which is required in the case of a two-component urethane coating composition, is not required. However, the curing temperature of the one-component urethane coating composition is high and has been desired to be decreased. The high baking temperature has limited coating on a material having low heat resistance, as well as been causing a lot of energy to be consumed.

There are several proposals for improving the low-temperature curability of a blocked polyisocyanate.

A certain degree of low-temperature curability was achieved by using a pyrazole compound as a blocking agent (Patent Document 1). However, unsmoothness, which was clearly visible to the naked eye, was formed on the surface of the coating film formed by using the compound as a curing agent, thereby sometimes providing a very poor appearance of the coating film.

In addition, a technique is proposed in which the number of the isocyanate functional groups is increased to improve the low-temperature curability of a blocked polyisocyanate (Patent Document 2). Although the technique achieved a certain degree of the low-temperature curability, the hardness of the cured coating film was insufficient in some cases.

Because the necessity of a high temperature in curing brings about increase in the generation of carbon dioxide gas and the energy cost, further low-temperature curability is desired.

PATENT DOCUMENT 1: European Patent No. 0159117
PATENT DOCUMENT 2: JP 08-325353 A

DISCLOSURE OF THE INVENTION

Problems to be Solved by the Invention

It is an object of the present invention to provide a blocked polyisocyanate blocked with a pyrazole compound which can form a coating film excellent in low-temperature curability, coating film appearance and coating film hardness and a urethane composition containing the same.

Means for Solving the Problems

As a result of intensive studies, the present inventors have found that the above problems can be solved by using a specific polyisocyanate and thereby completed the present invention.

1. A blocked polyisocyanate, wherein isocyanate groups of a polyisocyanate which is derived from an aliphatic diisocyanate and a polyol and satisfies all of the following conditions 1)-5) are mainly blocked with a pyrazole compound:
   1) the average number of the isocyanate groups: 3.0 to 20,
   2) the trimer concentration of diisocyanate monomer: 10 to 50% by mass,
   3) the concentration of the isocyanate groups: 5 to 22% by mass,
   4) the concentration of the polyol components: 5 to 40% by mass, and
   5) the concentration of the diisocyanate monomers: 3% by mass or less 2. The blocked polyisocyanate according to the above 1, wherein the average number of the isocyanate groups of the polyisocyanate is 3.5 to 20.

3. The blocked polyisocyanate according to the above 1 or 2, wherein the polyol is a polyol having an average number of hydroxy groups of 2 to 10.

4. A urethane composition comprising the blocked polyisocyanate according to any one of the above 1 to 3.

Effect of the Invention

A coating composition containing the blocked polyisocyanate of the present invention exhibits excellent low-temperature curability, and a coating film formed using the coating composition exhibits excellent appearance and has high coating film hardness and excellent weatherability.

BEST MODE FOR CARRYING OUT THE INVENTION

Hereinafter, the present invention will be described in detail with a focus on preferred embodiments.

The aliphatic diisocyanate which can be used in the present invention is a compound containing no benzene ring in the structure. The aliphatic diisocyanate monomer has preferably 4 to 30 carbon atoms, and examples of the aliphatic diisocyanate include tetramethylene-1,4-diisocyanate, pentamethylene-1,5-diisocyanate, hexamethylene diisocyanate, 2,2,4-trimethyl-hexamethylene-1,6-diisocyanate, lysine diisocyanate and the like. Among these, hexamethylene diisocyanate (hereinafter referred to as HDI) is especially preferred from the viewpoint of weatherability and industrial availability. These aliphatic diisocyanates may be used alone or in combination with one another.

Examples of the polyol used in the present invention include a non-polymerized polyol and a polymerized polyol. The non-polymerized polyol is a polyol not subjected to polymerization and the polymerized polyol is obtained by polymerizing a monomer.

Examples of the non-polymerized polyol include diols, triols and tetraols. Examples of the diols include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol, 2,2-diethyl-1,3-propanediol and the like, for example. Examples of the triols include glycerin, trimethylolpropane and the like, for example. Examples of the tetraols include pentaerythritol.

Examples of the polymerized polyol include a polyester polyol, a polyether polyol, an acrylic polyol and a polyolefin polyol.

Examples of the polyester polyol include a polyester polyol which is obtained by condensation reaction of a single compound or a mixture of dibasic acids selected from the group consisting of carboxylic acids such as succinic acid, adipic acid, sebacic acid, a dimer acid, maleic anhydride, phthalic anhydride, isophthalic acid, and terephthalic acid with a single compound or a mixture of polyhydric alcohols selected from the group consisting of ethylene glycol, propylene glycol, diethylene glycol, neopentyl glycol, trimethylolpropane, glycerin and the like; and polycaprolactones obtained by ring-opening polymerization of ε-caprolactone with a polyhydric alcohol and the like. These polyester polyols can be modified by an aromatic diisocyanate, an aliphatic or alicyclic diisocyanate and a polyisocyanate obtained therefrom. In this case, the aliphatic or alicyclic diisocyanate and the polyisocyanate obtained therefrom are especially preferred in terms of weatherability and yellowing resistance.

Examples of the polyether polyol include polyether polyols obtained by random addition or block addition of a single compound or a mixture of alkylene oxides such as ethylene oxide, propylene oxide, butylene oxide, cyclohexene oxide and styrene oxide to a single compound or a mixture of polyvalent hydroxy compounds with the use of a strongly basic catalyst such as a hydroxide including lithium, sodium or potassium hydroxide, an alcoholate and an alkyl amine, or a composite metal cyanide complex such as a metal porphyrin and a hexacyanocobalt acid zinc complex; polyether polyols obtained by reacting a polyamine compound such as ethylene diamines with an alkylene oxide; and so-called polymer polyols obtained by polymerizing an acrylamide and the like using these polyethers as a medium.

Examples of the polyvalent hydroxy compound include
1. diglycerin, ditrimethylolpropane, pentaerythritol, dipentaerythritol and the like, for example;
2. a sugar alcohol compound such as erythritol, D-threitol, L-arabinitol, ribitol, xylitol, sorbitol, mannitol, galactitol and rhamnitol, for example;
3. a monosaccharide such as arabinose, ribose, xylose, glucose, mannose, galactose, fructose, sorbose, rhamnose, fucose and ribodesose, for example;
4. a disaccharide such as trehalose, sucrose, maltose, cellobiose, gentiobiose, lactose and melibiose, for example;
5. a trisaccharide such as raffinose, gentianose and melezitose, for example; and
6. a tetrasaccharide such as stachyose, for example.

Examples of the acrylic polyol include an acrylic polyol, which is obtained by polymerizing, as an essential component, a single compound or a mixture selected from the group consisting of an acrylic ester having an active hydrogen and the like, such as 2-hydroxyethyl acrylate, 2-hydroxypropyl acrylate and 2-hydroxybutyl acrylate, an acrylic monoester or methacrylic monoester of glycerin, an acrylic monoester or methacrylic monoester of trimethylolpropane, a methacrylic ester having an active hydrogen and the like, such as 2-hydroxyethyl methacrylate, 2-hydroxypropyl methacrylate, 2-hydroxybutyl methacrylate, 3-hydroxypropyl methacrylate and 4-hydroxybutyl methacrylate, in the presence or absence of a single compound or a mixture selected from the group consisting of an acrylic ester such as methyl acrylate, ethyl acrylate, isopropyl acrylate, n-butyl acrylate and 2-ethylhexyl acrylate, a methacrylic ester such as methyl methacrylate, ethyl methacrylate, isopropyl methacrylate, n-butyl methacrylate, isobutyl methacrylate, n-hexyl methacrylate and lauryl methacrylate, an unsaturated carboxylic acid such as acrylic acid, methacrylic acid, maleic acid and itaconic acid, an unsaturated amide such as acrylamide, N-methylolacrylamide and diacetoneacrylamide, and other polymerizable monomers such as glycidyl methacrylate, styrene, vinyl toluene, vinyl acetate, acrylonitrile, dibutyl fumarate, and a vinyl monomer having a hydrolyzable silyl group such as vinyl trimethoxysilane, vinyl methyldimethoxysilane and γ-methacryloxy propylmethoxysilane, for example.

Examples of the polyolefin polyol include a polybutadiene having two or more hydroxy groups, a hydrogenated polybutadiene, a polyisoprene and a hydrogenated polyisoprene, for example. Examples of a preferred polyol include the aforementioned non-polymerized polyols and a polycaprolactone polyol obtained by ring-opening polymerization of s-caprolactone, which is an aforementioned polymerized polyol. A triol is especially preferred in order to obtain high coating film hardness.

In order to obtain the polyisocyanate used in the present invention, it is preferable to react the isocyanate group of the aforementioned aliphatic diisocyanate with the hydroxy group of the aforementioned polyol and conduct an isocyanuration reaction which forms an isocyanurate bond formed with three isocyanate groups. A part or all of the urethane bond, which is formed by the reaction between the isocyanate group and the hydroxy group, is changed to an allophanate bond by the isocyanuration reaction.

In the case of reacting the aforementioned diisocyanate and polyol, it is preferable that the proportion of the diisocyanate to the polyol be 5 to 50 and preferably 10 to 20 in terms of the equivalent ratio of isocyanate group/hydroxy group. If the equivalent ratio is 5 or more, the viscosity of the resulting polyisocyanate is not increased, and if the equivalent ratio is 50 or less, the average number of the isocyanate groups of the polyisocyanate composition is easily increased. The reaction temperature is 50 to 200° C. and preferably 50 to 150° C. If the reaction temperature is 50° C. or more, the reaction readily proceeds, and if the reaction temperature is 200° C. or less, unfavorable side reactions such as coloring of a product are also suppressed.

The isocyanuration reaction which forms an isocyanurate group is carried out after or simultaneously with the urethanation reaction in which a part or all of the hydroxy group is reacted. The isocyanuration reaction temperature is 50 to 200° C. and preferably 50 to 150° C. If the reaction temperature is 50° C. or more, the reaction readily proceeds, and if the reaction temperature is 200° C. or less, unfavorable side reactions such as coloring of a product are suppressed.

A preferred isocyanuration catalysts used in this case generally has basicity, and examples of the catalyst include
1. a hydroxide of a tetraalkylammonium such as tetramethylammonium and tetraethylammonium, or a salt of an organic weak acid such as acetic acid and capric acid;
2. a hydroxide of a hydroxyalkylammonium such as trimethylhydroxypropylammonium, trimethylhydroxyethylammonium, triethylhydroxypropylammonium and triethylhydroxyethylammonium, or a salt of an organic weak cid such as acetic acid and capric acid;
3. a metal salt such as a tin, zinc, or lead salt of an alkylcarboxylic acid such as acetic acid, caproic acid, octylic acid and myristic acid;
4. an alcoholate of a metal such as sodium and potassium;

5. an aminosilyl group-containing compound such as hexamethyldisilazane;
6. Mannich bases;
7. a combination use of a tertiary amine and an epoxy compound; and
8. a phosphorus compound such as tributylphosphine.

The amount used of these catalysts is selected from the range between 10 ppm and 1% based on the total mass of the diisocyanate and polyol. In order to stop the reaction, these catalysts are deactivated, for example, by addition of an acidic substance that neutralizes the catalyst such as phosphoric acid and an acidic phosphate ester, pyrolysis or chemical decomposition.

The yield of the polyisocyanate is selected from the range between 10 and 70% by mass. As the polyisocyanate is obtained at a higher yield, the viscosity of the polyisocyanate is increased.

After completion of the reaction, unreacted diisocyanate monomers are removed by a thin film evaporator, extraction and the like, and the polyisocyanate contains substantially no unreacted diisocyanate monomers. The concentration of the residual unreacted diisocyanate in the resulting polyisocyanate (Condition 5)) is 3% by mass or less, preferably 1% by mass or less and more preferably 0.5% by mass or less. If the concentration of the unreacted diisocyanate exceeds 3% by mass, the curability of the polyisocyanate is deteriorated in some cases.

The average number of isocyanate groups of the polyisocyanate used in the present invention (a statistical number of isocyanate groups contained in one molecule of the polyisocyanate) (Condition 1)) is 3.0 to 20, preferably 3.50 to 15 and more preferably 4.5 to 15. If the average number of isocyanate groups is less than 3.0, the curability of the polyisocyanate is deteriorated in some cases, and if the average number of isocyanate groups exceeds 20, the viscosity of the blocked polyisocyanate is increased and the solid content of the coating composition is reduced.

The polyol component concentration in the polyisocyanate used in the present invention (the mass concentration of the polyol-derived components in the polyisocyanate) (Condition 4)) is 5 to 40% by mass and preferably 5 to 30% by mass. If the polyol component concentration is less than 5%, the average number of isocyanate groups is decreased in some cases, and if the polyol component concentration exceeds 40% by mass, the coating film hardness is reduced and the weatherability is deteriorated in some cases.

The concentration of trimer (Condition 2), which is generated by the isocyanuration reaction, contains an isocyanurate bond and is formed by three molecules of the diisocyanate monomer, is 10 to 50% by mass and preferably 15 to 40% by mass. If the trimer concentration is less than 10% by mass, the coating film hardness is reduced and the weatherability is deteriorated in some cases. If the trimer concentration exceeds 50% by mass, the appearance of the coating film formed is deteriorated in some cases.

The isocyanate group concentration (Condition 3), which is the concentration of the isocyanate group in the polyisocyanate and is the mass concentration calculated assuming that an isocyanate group has the formula mass of 42, is 5 to 22% by mass. If the isocyanate group concentration is less than 5% by mass, the urethane bond concentration in the coating film formed is decreased and the flexibility is decreased in some cases, and if the isocyanate group concentration exceeds 22% by mass, it is difficult to increase the average number of the isocyanate groups and the curability is deteriorated in some cases.

A blocked polyisocyanate is obtained by blocking isocyanate groups of the polyisocyanate thus obtained with a pyrazole compound.

The pyrazole compound is a compound represented by the following formula.

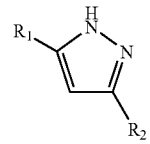

[Formula 1]

($R_1$ and $R_2$ may be the same or different from each other and represent hydrogen or an alkyl group having 1 to 6 carbon atoms. Examples of the alkyl group include methyl, ethyl, n-propyl, and isopropyl. Examples of the specific compound include pyrazole, 3,5-dimethylpyrazole, and 3-methylpyrazole, and 3,5-dimethylpyrazole is preferred.)

It was surprising that when the blocked polyisocyanate blocked with a conventional pyrazole compound was used, the appearance of the coating film was dramatically improved. When the curing of the coating film is carried out nonuniformly in the depth direction, the appearance of the coating film is deteriorated in some cases. It is easily supposed that the uniformity of the molecular-weight structure of the conventional polyisocyanate, which is obtained without using a polyol as an auxiliary material and by using only a diisocyanate as a raw material, is higher than that of a polyisocyanate, which is used in the present invention and is obtained by using a polyol as an auxiliary material. It is really interesting that the coating film, which is formed by the blocked polyisocyanate of the present invention using a polyisocyanate having low uniformity, is significantly excellent in appearance, in comparison with the blocked polyisocyanate using the abovementioned polyisocyanate having high uniformity.

Further, it was surprising that high coating film hardness was achieved and the curability was high. The molecular movement in the coating film is decreased when the hardness is high. The decreased molecular movement leads to decrease in the molecular collision frequency, thereby reducing the molecular reactivity. It was also surprising that the present invention achieved high coating film hardness and excellent low-temperature curability.

The isocyanate groups of the polyisocyanate are mainly blocked with a pyrazole compound by reacting the polyisocyanate with the pyrazole compound, thereby enabling to obtain a blocked polyisocyanate. The reaction may be carried out in the presence of an organic solvent, and an organic solvent which does not react with isocyanate groups should be used. The reaction temperature is 50 to 100° C. The amount used of the pyrazole compound is in the range of 50 to 110% by equivalent, based on the isocyanate group of the polyisocyanate, and is preferably 70 to 110% by equivalent and more preferably 99 to 105% by equivalent. In consideration of the weighing range in production, the pyrazole compound in excess to the isocyanate group is used to confirm that all of the isocyanate groups react with the pyrazole compound. There may be simultaneously used other blocking agents such as an oxime compound including methyl ethyl ketoxime and acetoxime and an active methylene compound including dimethyl malonate, diethyl malonate and ethyl acetoacetate, as needed. The blocked polyisocyanate of the present invention preferably contains no hydrophilic groups such as those of polyethylene glycol. The addition of these hydrophilic groups decreases the coating film hardness in some cases.

The blocked polyisocyanate of the present invention is mixed with a compound containing two or more active hydrogens in the molecule which are reactive with isocyanate groups, thereby providing a urethane composition of the present invention. The blocked polyisocyanate reacts with the active hydrogens of the active hydrogen-containing compound, thereby forming crosslinkage. Examples of the compound containing two or more active hydrogens include a polyol, a polyamine and a polythiol, and a polyol is used in many cases. Examples of the polyol include an acrylic polyol, a polyester polyol, a polyether polyol and a fluorine polyol. Examples of preferred polyols include an acrylic polyol, a polyester polyol and a fluorine polyol. The hydroxyl value of these polyols is selected from the range of 30 to 200 mg KOH/g and the acid value of these polyols is selected from the range of 0 to 30 mg KOH/g.

The equivalent ratio of the isocyanate group of the blocked polyisocyanate to the hydroxy group of the polyol is 0.5 to 1.5, and the ratio is selected depending on the required properties, as appropriate.

There may be added a melamine curing agent such as a fully alkylated melamine, an alkylated methylol melamine and an alkylated imino melamine, as needed.

In addition, various solvents and additives may be used depending on the application and purpose. A solvent can be optionally selected as appropriate depending on the purpose and application, and then used, from the group consisting of, for example, ketones such as acetone, methyl ethyl ketone and methyl isobutyl ketone, esters such as ethyl acetate, n-butyl acetate and cellosolve acetate, and alcohols such as butanol and isopropyl alcohol. These solvents can be used either alone or in combination of two or more kinds.

Further, there may be added an antioxidant such as a hindered phenol, an ultraviolet absorber such as benzotriazole and benzophenone, a pigment such as titanium oxide, carbon black, indigo, quinacridone and pearl mica, a metallic powder pigment such as aluminum, a rheology control agent such as hydroxyethylcellulose, a urea compound and a microgel, and a curing accelerator such as a tin compound, a zinc compound and an amine compound, as needed.

The urethane composition thus prepared is used as an primer or intermediate coating composition for a material such as a metal including a steel plate and a surface-treated steel plate, an organic polymer including plastics and fibers and an inorganic material by roll coating, curtain flow coating, spray coating, antistatic coating, bell coating, electrodeposition coating, dip coating and the like. The urethane composition is useful for imparting good appearance, weatherability, acid resistance, rust resistance, chipping resistance and the like to a pre-coated metal including a rust-preventive steel plate, an automobile coating, and the like It is also useful as an adhesive, a pressure-sensitive adhesive, an elastomer, a foam, a surface treatment agent and the like.

The present invention will be specifically described below.

Hereinafter, the present invention will be described in more detail with reference to examples, but the present invention is not limited to the examples described below. All parts represent parts by mass.

(Measurement of Number Average Molecular Weight)

The number average molecular weight is a number average molecular weight based on polystyrene standard as measured by gel permeation chromatography (hereinafter, referred to as GPC) using the following apparatus.

Apparatus: HLC-802A (trade name) manufactured by Tosoh Co., Ltd.
Column: G1000HXL (one column)
G2000HXL (one column)
G3000HXL (one column) each manufactured by Tosoh Co., Ltd.
Carrier: Tetrahydrofuran
Detection method: Differential refractometer
(Concentration of Unreacted Diisocyanate Monomer)

The peak area % of the molecular weight corresponding to the unreacted diisocyanate (for example, 168 in the case of HDI) obtained by the above GPC measurement was expressed as the mass concentration thereof.
(Concentration of Aliphatic Diisocyanate Trimer)

The peak area % of the molecular weight corresponding to the aliphatic diisocyanate trimer (for example, 504 in the case of HDI) obtained by the above GPC measurement was expressed as the concentration thereof.
(Measurement of Viscosity)

The viscosity was measured at 25° C. using an E-type viscometer (VISCONIC ED (trade name) Model, manufactured by Tokimec Co.)
(Gel Fraction)

After the cured coating film was immersed in acetone at 20° C. for 24 hours, the ratio of the mass of the undissolved portion to the mass of the film before immersion was calculated.
(Hardness of Coating Film)

The hardness of a coating film with a thickness of 40 μm was measured at 20° C. using Konig hardness tester (Pendulum Hardness Tester (trade name) manufactured by BYK Gardner Co., Ltd.)
(Appearance of Coating Film)

A cured coating film was measured by a scanning white light interferometer (NewView 7300 (trade name), manufacture by Zygo Corporation, 2.5-fold object lens). The difference between the maximum and the minimum of the peak was represented in terms of μm.

Production Example 1

Production of Polyisocyanate

After purging the inside of a four-necked flask equipped with a stirrer, a thermometer, a reflux condenser pipe, a nitrogen blowing pipe and a dropping funnel with nitrogen, 600 parts of HDI and 30 parts of polycaprolactone polyester triol "Placcel 303" (trade name of Daicel Chemical Industries, Ltd., molecular weight: 300), which is a trivalent alcohol, was charged therein, and the pre-reaction was carried out by maintaining the temperature in the reactor at 90° C. for one hour under stirring. Thereafter, the temperature in the reactor was maintained at 60° C. and tetramethylammonium caprylate was added as an isocyanuration catalyst. When the yield was 54%, phosphoric acid was added to stop the reaction. After filtering the reaction liquid, unreacted HDI was removed using a thin film evaporator. The resulting polyisocyanate had a viscosity at 25° C. of 9500 mPa·s, a concentration of isocyanate groups of 19.2% by mass, a number average molecular weight of 1100 and an average number of isocyanate groups of 5.1. The polyol component concentration in the polyisocyanate was 8.8% by mass and the residual HDI concentration was 0.2% by mass.

Production Examples 2 to 6

A polyisocyanate was produced in the same manner as in Production Example 1 except that the charging compositions and reaction conditions shown in Table 1 were applied. The characteristics of the resulting polyisocyanate are shown in Table 1.

Comparative Production Example 1

A polyisocyanate was produced in the same manner as in Production Example 1 except that the charging compositions and reaction conditions shown in Table 1 were applied. The characteristics of the resulting polyisocyanate are shown in Table 1.

Comparative Production Example 2

An HDI of 600 parts and 49 parts of a polyether polyol (SC-800, trade name of Adeka Corporation, octavalent polyol) were charged and the reaction was carried out at 160° C. for 8 hours. The production was carried out in the same manner as in Production Example 1 except that the isocyanuration reaction was not carried out. The results are shown in Table 1.

Comparative Production Example 3

The production was carried out in the same manner as in Production Example 6 except that 0.1 parts of 1,3-butanediol was used. The yield was 25%. The results are shown in Table 1.

Example 1

After purging the inside of a four-necked flask equipped with a stirrer, a thermometer, a reflux condenser pipe, a nitrogen blowing pipe and a dropping funnel with nitrogen, 500 parts of the polyisocyanate obtained in Production Example 1 and 169 parts of xylene were charged and then mixed. Further, 230 parts of 3,5-dimethylpyrazole (isocyanate group/3,5-dimethylpyrazole=1.05 (equivalent ratio)) was added and then mixed. The temperature of the resulting mixture liquid was raised to 60° C. The mixture liquid was maintained until the characteristic absorption of isocyanate group of a sample taken from the mixture liquid measured by the infrared spectral measurement disappeared.

There was obtained a blocked polyisocyanate (curing agent) of the present invention which had a solid content of 80% by mass and an blocked isocyanate group concentration of 13.4% (based on the blocked polyisocyanate).

Examples 2 to 6 and Comparative Examples 1 to 4

The production was carried out in the same manner as in Example 1 except that the charging compositions shown in Table 2 were applied. The results of solution properties of the resulting blocked polyisocyanate (curing agent) are shown in Table 2.

Example 7

A coating composition having a solid content of 50% was prepared by mixing 100 parts of an acrylic polyol (Setalux 1903 (trade name), manufactured by Nuplex Resins, hydroxyl group content: 4.5% (based on resin), solid resin content: 75%), 78 parts of the blocked polyisocyanate obtained in Example 1 (isocyanate group/hydroxy group=1.0 (equivalent ratio), 0.7 parts of dibutyl tin dilaurate (concentration to resin: 0.5% by mass) and 96 parts of butyl acetate. This coating composition was applied with an applicator on an electrodeposition coating plate so that the resin film thickness was 40 μm. After setting at room temperature for 10 minutes, the plate was maintained in an oven at 130° C. for 30 minutes. The physical properties of the cured coating film were evaluated. The evaluation results are shown in Table 3.

Examples 8 to 12 and Comparative Examples 5 to 8

The production was carried out in the same manner as in Example 7 except that the curing agents (Examples 2 to 6 and Comparative Examples 1 to 3) shown in Table 3 were used. Dibutyl tin dilaurate and the solid content were set at the same concentration. The evaluation results of properties of the cured coating films are shown in Table 3.

TABLE 1

| | Amount charged | | Reaction conditions | | | |
| | | | Reaction without catalyst | | Isocyanuration reaction | |
| Example | Diisocyanate | Polyol | Temperature ° C. | Time Hr | Temperature ° C. | Yield % |
| --- | --- | --- | --- | --- | --- | --- |
| Production Example 1 | HDI 600 parts | Placcel 303 30 parts | 90 | 1 | 60 | 54 |
| 2 | HDI 600 parts | Placcel 303 60 parts | 90 | 1 | 60 | 47 |
| 3 | HDI 600 parts | Placcel 303 60 parts | 90 | 1 | 60 | 63 |
| 4 | HDI 600 parts | Placcel E-496 *1 69 parts | 90 | 1 | 80 | 48 |
| 5 | HDI 600 parts | Trimethylolpropane 20 parts | 90 | 1 | 80 | 48 |
| 6 | HDI 600 parts | 1,3-Butanediol 11 parts | 80 | 2 | 60 | 60 |
| Comparative Production Example 1 | HDI 600 parts | None | — | — | 60 | 30 |
| Comparative Production Example 2 | HDI 600 parts | Polyetherpolyol *2 49 parts | 160 | 8 | — | 27 |
| Comparative Production Example 3 | HDI 600 parts | 1,3-Butanediol 0.1 part | 80 | 2 | 60 | 25 |

Characteristics of polyisocyanate

Number    Trimer    Average    Polyol

TABLE 1-continued

| Example | NCO *3 Concentration % | Viscosity mPa·s/ 25° C. | average molecular weight | concentration % | number of NCO *4 groups | component concentration | Residual HDI concentration % |
|---|---|---|---|---|---|---|---|
| Production Example 1 | 19.2 | 9500 | 1120 | 29 | 5.1 | 8.8 | 0.2 |
| 2 | 17.6 | 20000 | 1450 | 12 | 6.1 | 19.3 | 0.2 |
| 3 | 17.5 | 31000 | 1820 | 19 | 7.6 | 14.4 | 0.2 |
| 4 | 16.9 | 34000 | 1390 | 29 | 5.6 | 21.5 | 0.2 |
| 5 | 19.9 | 25000 | 1080 | 26 | 5.1 | 6.7 | 0.2 |
| 6 | 17.8 | 14000 | 990 | 40 | 4.2 | 11.1 | 0.2 |
| Comparative Production Example 1 | 22.7 | 1800 | 610 | 61 | 3.3 | 0 | 0.2 |
| Comparative Production Example 2 | 17.3 | 8600 | 1500 | 6 | 6.2 | 24.0 | 0.2 |
| Comparative Production Example 3 | 23.1 | 1750 | 630 | 63 | 3.2 | 2.6 | 0.2 |

*1: Tetravalent polyester polyol, Trade name "Placcel E496" of Daicel Chemical Industries, Ltd.
*2: Hexavalent polyether polyol, Trade name "ADEKA Polyether SC-800" of ADEKA Corporation
*3: NCO group concentration
*4: Average number of isocyanate groups

TABLE 2

| | Amount charged | | | Blocked Polyisocyanate solution properties | |
|---|---|---|---|---|---|
| Example | Polyisocyanate | Blocking agent | Xylene | Blocked NCO group concentration/resin | Solid content concentration % |
| Example 1 | Production Example 1 500 parts | Pyrazole *1 230 parts | 169 parts | 13.4 | 80 |
| Example 2 | Production Example 2 500 parts | Pyrazole 211 | 165 | 12.6 | 80 |
| Example 3 | Production Example 3 500 parts | Pyrazole 210 | 165 | 12.5 | 80 |
| Example 4 | Production Example 4 500 parts | Pyrazole 203 | 163 | 12.2 | 80 |
| Example 5 | Production Example 5 500 parts | Pyrazole 239 | 170 | 13.7 | 80 |
| Example 6 | Production Example 6 500 parts | Pyrazole 214 | 165 | 12.7 | 80 |
| Comparative Example 1 | Comparative Production Example 1 500 parts | Pyrazole 272 | 177 | 15.0 | 80 |
| Comparative Example 2 | Comparative Production Example 2 500 parts | Pyrazole 208 | 165 | 12.4 | 80 |
| Comparative Example 3 | Comparative Production Example 3 500 parts | Pyrazole 277 | 178 | 12.1 | 80 |
| Comparative Example 4 | Production Example 1 500 parts | MEKOxime *2 208 | 165 | 13.7 | 80 |

*1: 3,5-Dimethylpyrazole
*2: Methylethylketoxime

TABLE 3

| Example | Curing agent | Gel fraction | Coating film hardness | Coating film appearance |
|---|---|---|---|---|
| Example 7 | Example 1 | 92 | 135 | 1> |
| Example 8 | Example 2 | 94 | 131 | 1> |
| Example 9 | Example 3 | 95 | 132 | 1> |
| Example 10 | Example 4 | 93 | 130 | 1> |
| Example 11 | Example 5 | 91 | 136 | 1> |
| Example 12 | Example 6 | 88 | 131 | 2 |
| Comparative Example 4 | Comparative Example 1 | 67 | 135 | 16 |
| Comparative Example 5 | Comparative Example 2 | 92 | 10 | 1> |
| Comparative Example 6 | Comparative Example 3 | 68 | 138 | 20 |
| Comparative Example 7 | Comparative Example 4 | 72 | 83 | 1> |

INDUSTRIAL APPLICABILITY

The blocked polyisocyanate of the present invention and a coating composition containing the same can be used suitably for coatings of various materials and the like.

The invention claimed is:

1. A blocked polyisocyanate, wherein isocyanate groups of a polyisocyanate which is derived from an aliphatic diisocyanate and a polyol selected from the group consisting of polyester triols and tetraols and satisfies all of the following conditions 1)-6) are mainly blocked with a pyrazole compound:
   1) the average number of the isocyanate groups is 3.0 to 20,
   2) the trimer concentration of the diisocyanate monomer is 10 to 50% by mass,
   3) the concentration of the isocyanate groups is 5 to 22% by mass, 4) the concentration of the polyol components is 5 to 40% by mass,
5) the concentration of the diisocyanate monomer is 3% by mass or less, and
6) the viscosity of the polyisocyanate at 25° C. is from 14000 to 34000 mPa·s.

2. The blocked polyisocyanate according to claim 1, wherein the average number of the isocyanate groups of the polyisocyanate is 3.5 to 20.

3. A urethane composition comprising the blocked polyisocyanate according to claim 1.

4. A urethane composition comprising the blocked polyisocyanate according to claim 2.

* * * * *